(12) United States Patent
Banerjee et al.

(10) Patent No.: US 6,996,604 B2
(45) Date of Patent: Feb. 7, 2006

(54) PRE-AVAILABILITY OF A LECTURE TO PROMOTE INTERACTIVITY

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/965,151

(22) Filed: Sep. 27, 2001

(65) Prior Publication Data

US 2004/0205130 A1    Oct. 14, 2004

(51) Int. Cl.
*G06F 15/16* (2006.01)

(52) U.S. Cl. ............... 709/204; 435/365; 435/350; 715/753

(58) Field of Classification Search ............... 434/350, 434/335; 709/204, 205
See application file for complete search history.

(56) References Cited

U.S. PATENT DOCUMENTS

| | | | |
|---|---|---|---|
| 5,295,836 A * | 3/1994 | Ryu et al. ............ | 434/335 |
| 5,537,141 A | 7/1996 | Harper et al. ........ | 348/12 |
| 5,926,624 A | 7/1999 | Katz et al. ........... | 395/200.47 |
| 5,974,446 A * | 10/1999 | Sonnenreich et al. | 709/204 |
| 6,024,577 A | 2/2000 | Wadahama et al. ... | 434/322 |
| 6,029,195 A | 2/2000 | Herz ................... | 709/219 |
| 6,074,216 A | 6/2000 | Cueto .................. | 434/322 |
| 6,091,930 A | 7/2000 | Mortimer et al. .... | 434/362 |
| 6,144,991 A * | 11/2000 | England .............. | 709/205 |
| 6,170,060 B1 | 1/2001 | Mott et al. ........... | 713/201 |
| 6,516,340 B2 * | 2/2003 | Boys .................. | 709/204 |
| 2001/0049087 A1 * | 12/2001 | Hale .................... | 434/350 |
| 2001/0049088 A1 * | 12/2001 | Ichiyoshi ............. | 434/350 |
| 2002/0156848 A1 * | 10/2002 | Grouse ................ | 709/204 |

FOREIGN PATENT DOCUMENTS

JP          9218640          8/1997

* cited by examiner

*Primary Examiner*—John Follansbee
*Assistant Examiner*—Dustin Nguyen
(74) *Attorney, Agent, or Firm*—Duke W. Yee; Jeffrey S. LaBaw; Betty Formby (57) ABSTRACT

A method, computer program, and data processing system for promoting an interactive discussion of lecture notes prior to an actual lecture using those notes is disclosed. An first client uploads lecture notes for perusal by students. If a student has a question regarding a particular section of the lecture notes, the student can post a question directed to that particular section of the notes. The first client is alerted that a question has been posted and may respond by modifying or augmenting the lecture notes as appropriate.

1 Claim, 7 Drawing Sheets

PRE-AVAILABILITY OF A LECTURE TO PROMOTE INTERACTIVITY

BACKGROUND OF THE INVENTION

1. Technical Field

The present invention relates generally to computer-aided instruction (CAI). More specifically, the present invention provides a method, computer program, and data processing system for an interactive online discussion of lecture notes.

2. Description of Related Art

Since the introduction of the World Wide Web and the subsequent commercialization of the Internet, the world has become a considerably more connected place. No longer bound to the primitive communications interfaces of the past, the Internet is now host to a variety of powerful communications media, including interactive hypertext browsing (the World Wide Web), instant messaging, streaming video and audio, and multimedia electronic mail.

Hypertext is a method of organizing textual and graphical information on a computer screen. Information is organized into "pages," which resemble printed pages in a book or (perhaps more accurately) printed scrolls (since a hypertext page can be of any length). The primary difference between hypertext and the printed word, however, lies in the fact that hypertext pages can contain links. That is, a portion of a hypertext document, such as a phrase or a graphic, may be made sensitive to clicking by the mouse such that when the user clicks on that portion, the user is directed to a new page or a different section of the current page. For instance, it is a common practice to make bibliographic citations into links. When a user clicks on one of these citations, the cited text appears on the screen. Hypertext documents are displayed using a program called a "browser."

The largest and best-known repository of hypertext documents is the World Wide Web, a loosely bound collection of publicly accessible hypertext documents stored on computers the world over. The World Wide Web has become the preferred Internet medium for publishable information as well as for providing such interactive features as online shopping—to the extent that the terms Internet and World Wide Web are virtually synonymous to some.

Browsers can download hypertext documents from a server with the HyperText Transfer Protocol (HTTP). HTTP allows a browser to request documents or files from a server and receive a response. In addition, when browser users enter information into a form embedded into a hypertext page, the browser transmits the information to a server using HTTP. Form information can then be passed along to applications residing on the server by way of the Common Gateway Interface (CGI). Those applications can then return a result, which may be written in HTML. Thus, the Internet and Internet technologies such as the World Wide Web combine the precision and permanence of print media with much of the interactivity of oral conversation.

It is now commonplace for instructors, particularly at the university level, to upload lecture notes or other study materials to a website for the benefit of their students. Such uploaded materials are generally static, however. They are basically no different than materials handed out in a classroom on paper. As computers, and in particular the Internet, provide an ideal platform for interactive study, it is desirable, therefore, to introduce a level of interactivity into instructors' lecture notes to enhance the learning experience.

SUMMARY OF THE INVENTION

The present invention provides a method, computer program, and data processing system for promoting an interactive discussion of lecture notes prior to an actual lecture using those notes. An instructor uploads lecture notes for perusal by students. If a student has a question regarding a particular section of the lecture notes, the student can post a question directed to that particular section of the notes. The instructor is alerted that a question has been posted and may respond by modifying or augmenting the lecture notes as appropriate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
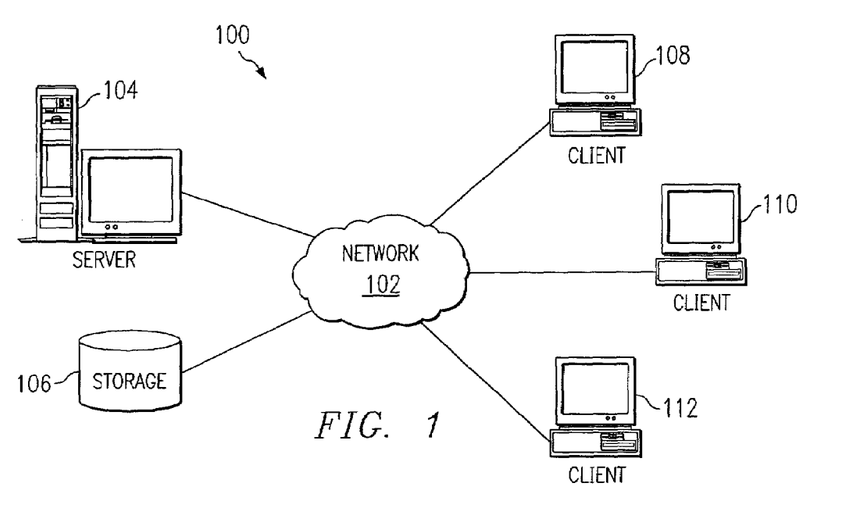
FIG. 1 is a diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), a wireless network, or a wide area network (WAN). FIG. 1 is intended as an example, and not as an architectural limitation for the present invention.

Figure 2:
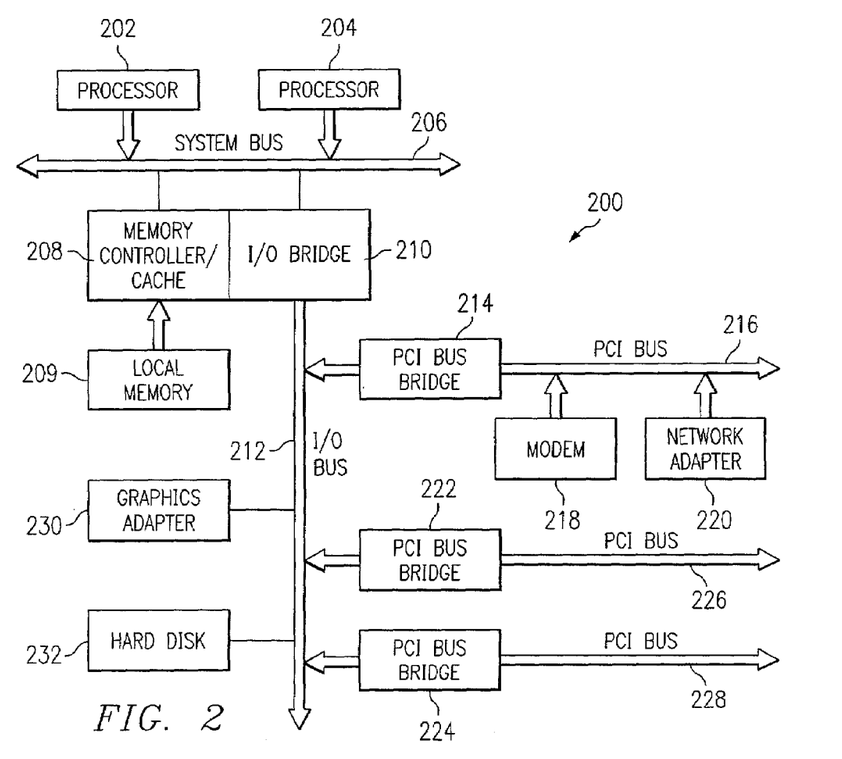
FIG. 2 is a block diagram of a data processing system suitable for use as a server in a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) or Linux operating system.

Figure 3:
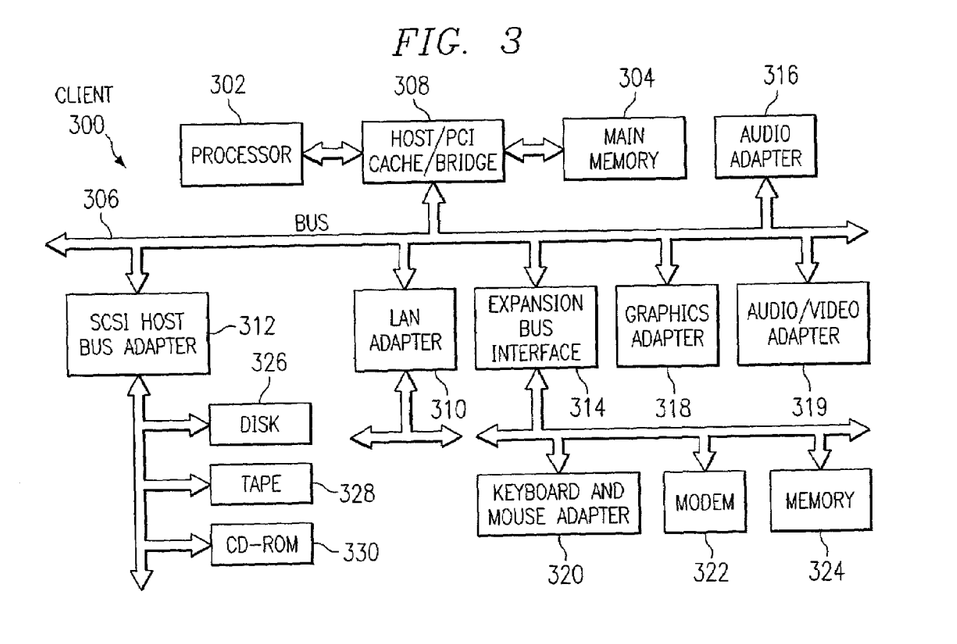
FIG. 3 is a block diagram of a data processing system suitable for use as a client in a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, computer program, and data processing system for promoting an interactive discussion of a set of lecture notes prior to an actual lecture using those notes. For the purposes of this application, the term "lecture" encompasses any type of instructional speech, including lectures, presentations, talks, seminars, or the like. "Lecture notes" may comprise text, graphics, audio, or any other suitable instructional media. One of ordinary skill in the art will appreciate that the processes of the present invention may be applied to electronic documents of all kinds, not simply those that contain lecture note material.

Figure 4:
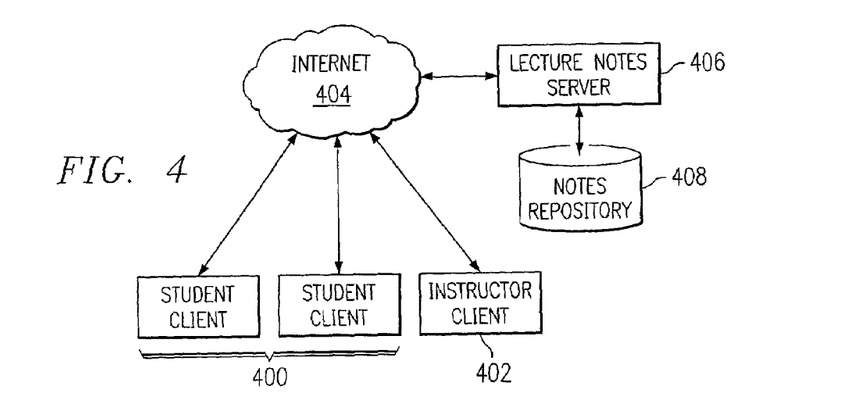
FIG. 4 is a diagram depicting an overall view of a preferred embodiment of the present invention.

FIG. 4 is a diagram depicting an overall view of a lecture notes pre-availability system in accordance with a preferred embodiment of the present invention. Student clients 400 are client computers operated by attendees of the lecture (hereinafter "students"). Instructor client 402 is a client operated by the lecturer (hereinafter "instructor"). Student clients 400 and instructor client 402 are all connected to Internet 404 and interact with lecture notes server 406, which is preferably some kind of web server. Lecture notes server 406 stores lecture notes and students' questions in lecture notes repository 408.

In a preferred embodiment of the invention, instructor client 402 uploads a set of lecture notes to lecture notes server 406. Lecture notes server 406 stores the lecture notes in lecture notes repository 408. Student clients 400 may register a login account with lecture notes server 406 (e.g., a standard username and password) and log into lecture notes server 406 to download and display to a student, lecture attendee, etc. the stored the notes stored in notes repository 408.

The notes are divided into sections, with each section, with each section preferably covering a separate subtopic. If a student/lecture attendee has a question about a particular section, he/she may post a question with his/her respective one of student clients 400 to be transmitted to lecture notes server 406. Instructor client 402 will be notified (e.g., through an electronic mail or instant message) that a question has been posted, and instructor client 402 will download the lecture notes, annotated with students' questions, from lecture notes server 406 for viewing. The instructor may then edit the lecture notes to address the point(s) raised in the question(s) and upload the revised notes to lecture notes server 406 to replace the original notes in notes repository 408. Before the actual lecture is given, instructor client 402 will preferably download the revised lecture notes for use by the instructor during the lecture.

Figure 5:
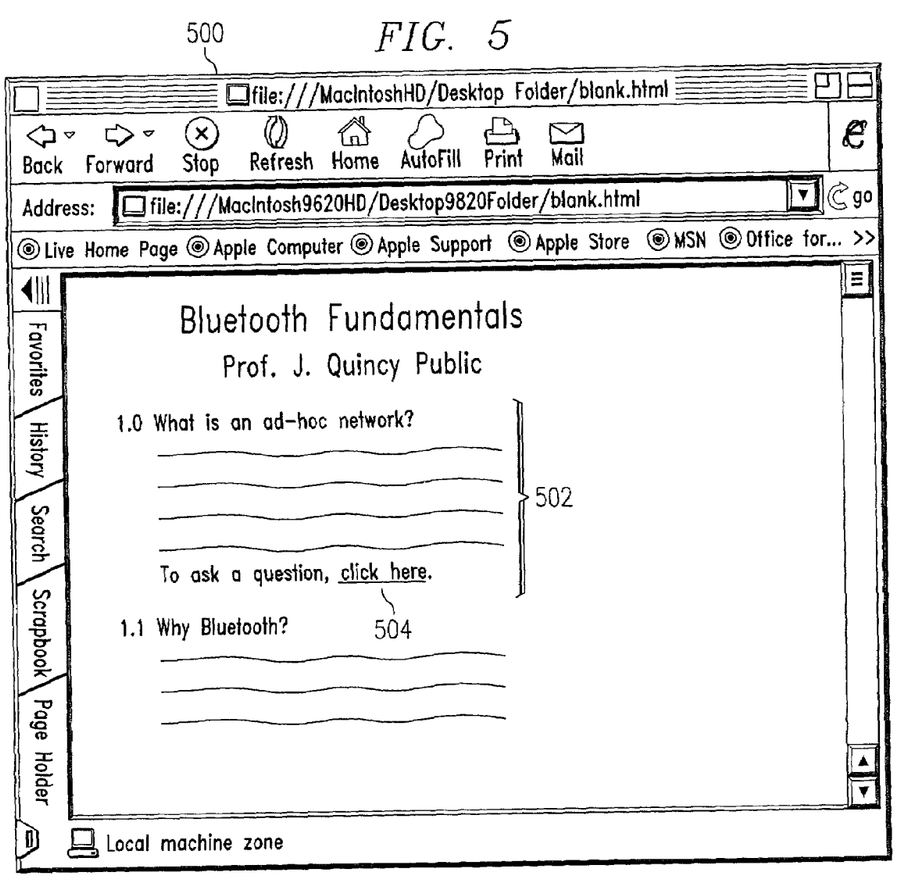
FIGS. 5–9 are screenshots depicting the operation of a preferred embodiment of the present invention from the perspective of an instructor and a student.

FIGS. 5–9 are screenshots depicting the operation of a preferred embodiment of the present invention from the perspective of a student and an instructor. FIG. 5 depicts a web browser 500 displaying a set of lecture notes to a student logged into lecture notes server 406 from a client computer. The lecture notes were prepared and uploaded by an instructor. The lecture notes are divided into sections, such as section 502. At the end of each section, the student is provided a link, such as link 504, so that the student may ask a question regarding the preceding section.

Figure 6:
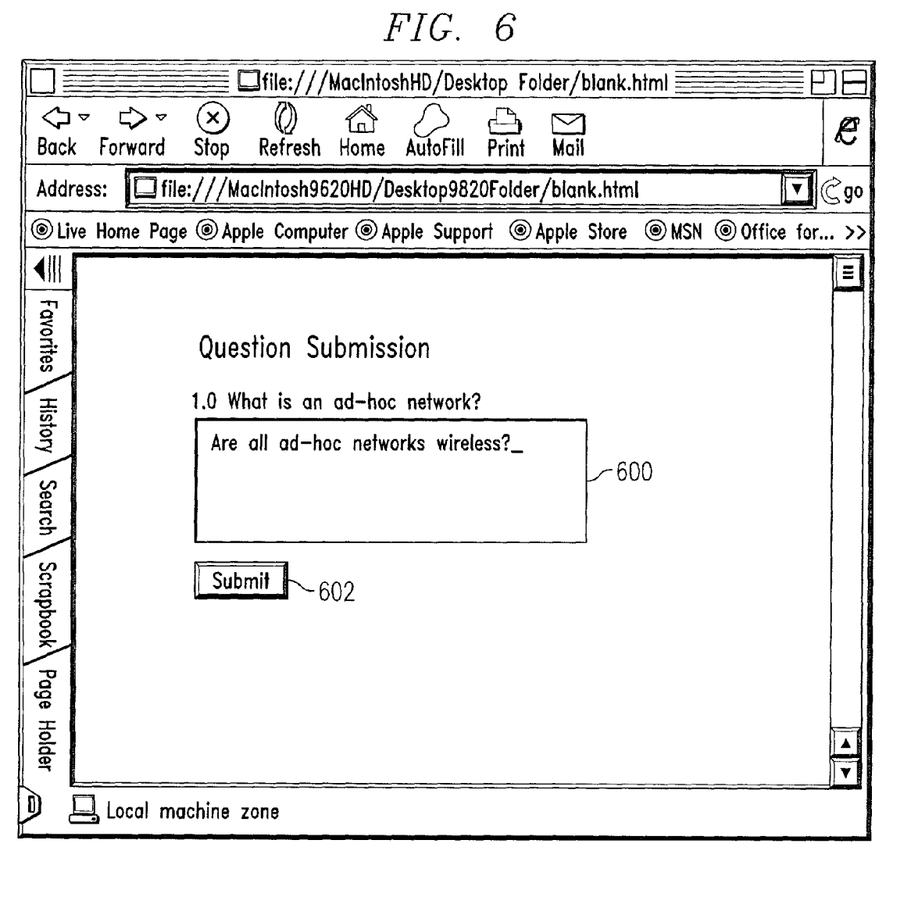

Clicking on link 504 causes the question submission screen shown in FIG. 6 to appear. An entry form 600 is provided for the student to enter a question regarding a particular section. The student clicks submit button 602 to submit the question for consideration by the instructor.

Figure 7:
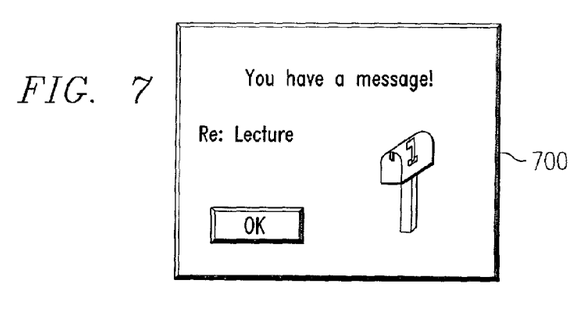

The instructor will then be alerted that the question has been submitted. This may take place using electronic mail, instant messaging, or any other suitable notification method. FIG. 7 depicts an alert window 700 produced by the instructor's electronic mail or instant messaging program to notify the instructor that a question has been posted.

Figure 8:
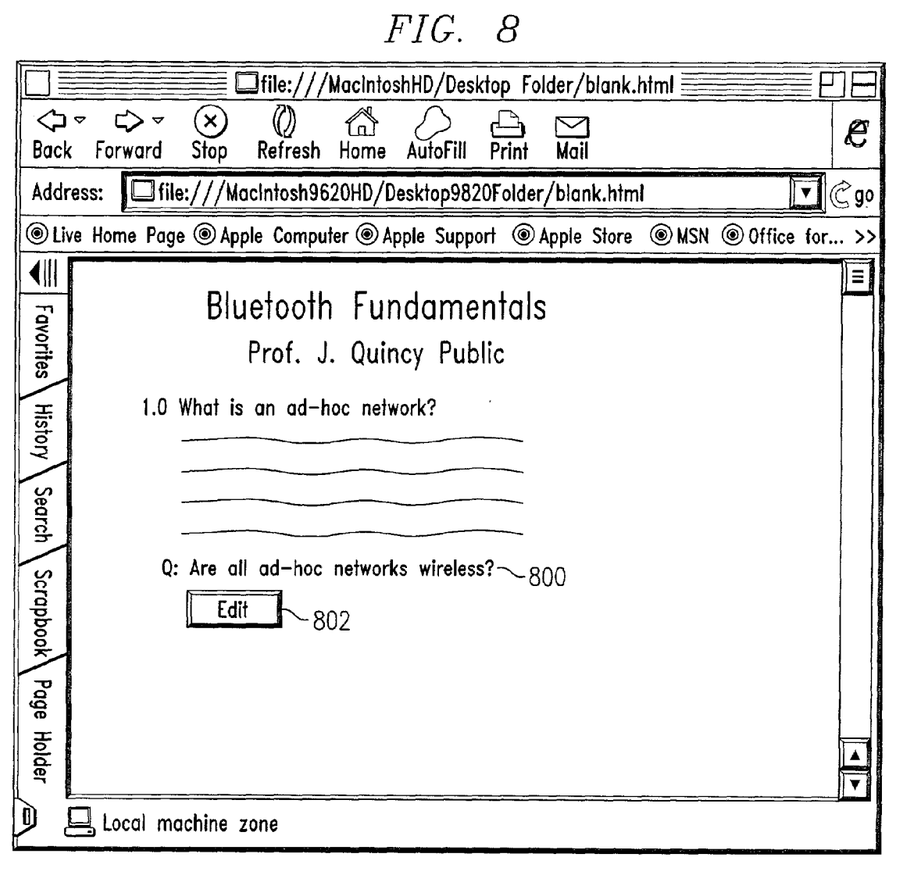

The instructor can then log into the lecture notes server and view the lecture notes with the posted questions embedded. FIG. 8 depicts a set of lecture notes with a posted question 800 embedded into the page. An edit control 802 may be clicked by the instructor to allow editing of the section to which posted question 800 refers. In this way, the lecture notes may be added to so as to address the subject material of the posted questions.

Figure 9:
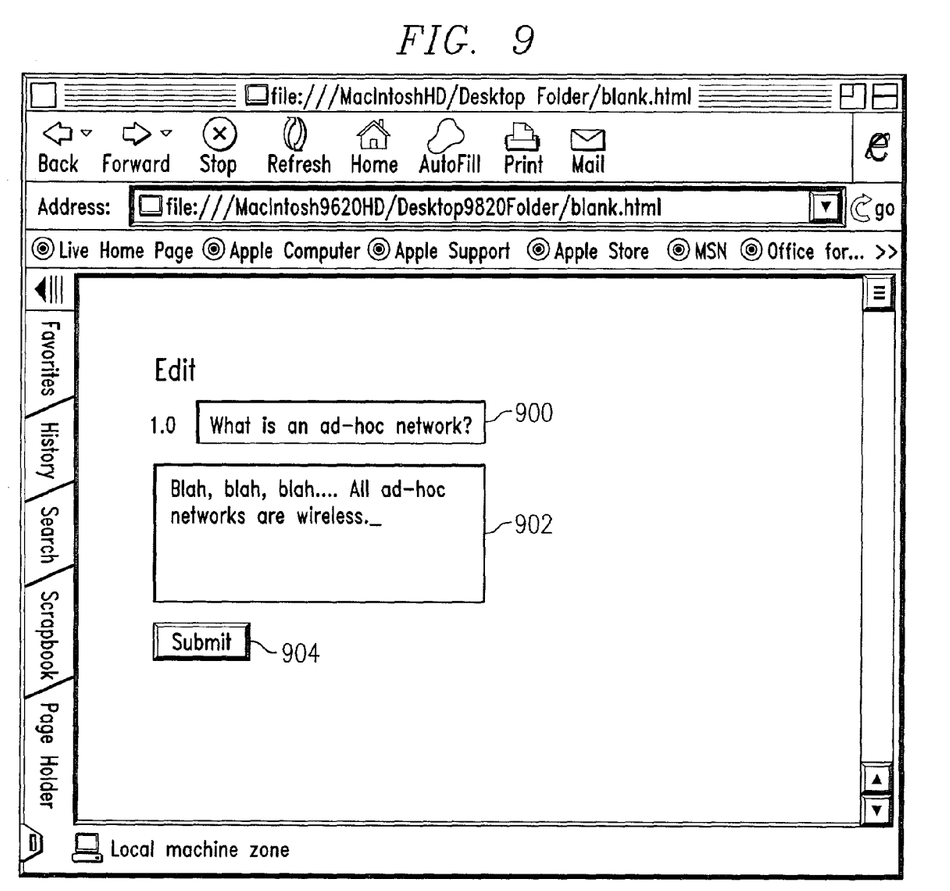

FIG. 9 depicts an editing screen for editing the section from which a posted question is derived. Heading control 900 allows the heading of the section to be edited. Section editing control 902 is a text area control containing the text of the section to be edited. The instructor can edit the text by making changes in section editing control 902 and clicking submit control 904.

Figure 10:
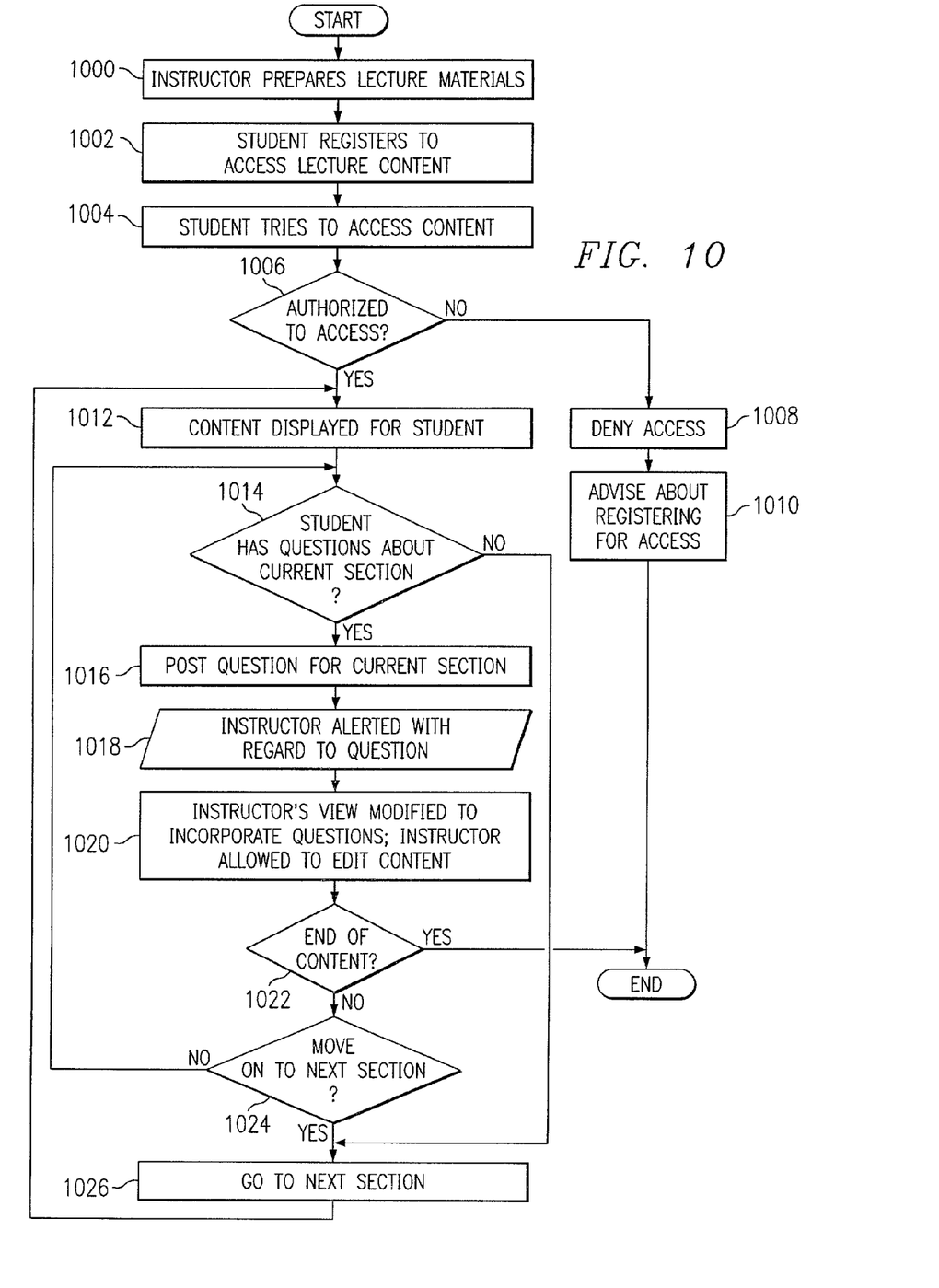
FIG. 10 is a flowchart representation of a process of providing interactive lecture note pre-availability in accordance with a preferred embodiment of the present invention.

FIG. 10 is a flowchart representation of a preferred embodiment of the present invention. First, an instructor prepares lecture materials and uploads them to the lecture notes server (step 1000). A student can register for access to the lecture content (step 1002). Once registered, the student may login to access the lecture content (step 1004).

If the student has not registered (step 1006: No), access will be denied (step 1008) and the student will be advised to register to view content (step 1010). If the student has registered (step 1006: Yes), at least a section of lecture content will be displayed for the student (step 1012). If the student has no questions regarding the displayed section (step 1014: No), the student may proceed to the next section (step 1026).

If the student has a question about a given section, however, the student may post the question to the lecture notes server (step 1016). The instructor will be alerted that the question has been posted (step 1018).

When the instructor views the lecture notes, they will be modified so as to include the posted questions, and the instructor will be given a change to edit the lecture notes to address the question (step 1020). Meanwhile, if there is no additional content for the student to view (step 1022: Yes), the process ends. If there is additional content (step 1022: No), the student may move on to the next section (step 1024: Yes, 1026) or post additional questions regarding the current section (step 1024: No, 1014).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of making lecture notes available prior to a lecture, the method comprising:

prior to a time when a lecture or series of lectures is to be given, receiving a set of lecture notes from a first user and saving the set of lecture notes to a database as an original set of lecture notes, wherein authorized users can access the original set of lecture notes, wherein the set of lecture notes includes a plurality of sections;

receiving, from a second user, a request to access the original set of lecture notes;

if it is determined that the second user is one of the authorized users, displaying the original set of lecture notes to the second user, wherein a display of a first section of the plurality of sections of the set of original lecture notes contains a respective first link for receiving questions regarding the content of the first section;

subsequent to displaying the original set of lecture notes to the second user, receiving, from the second user, a first question relating to the first section, the first question being submitted using the first link;

when the first question is received, alerting the first user electronically and providing the first user with a copy of the original set of lecture notes having the first question shown in association with the first section;

receiving, from the first user, modifications to the copy of the original set of lecture notes to form a modified set of lecture notes; and saving the modified set of lecture notes to the database such that the modified set of lecture notes replaces the original set of lecture notes.

* * * * *